Nov. 6, 1951　　A. E. MILLER　　2,574,054
FLUID VALVE
Filed Dec. 2, 1944　　5 Sheets-Sheet 1
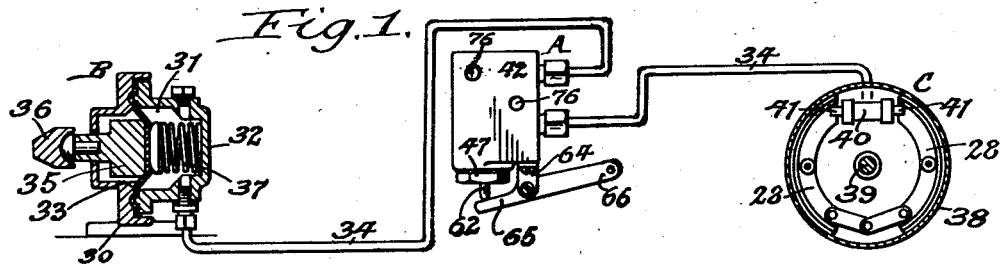
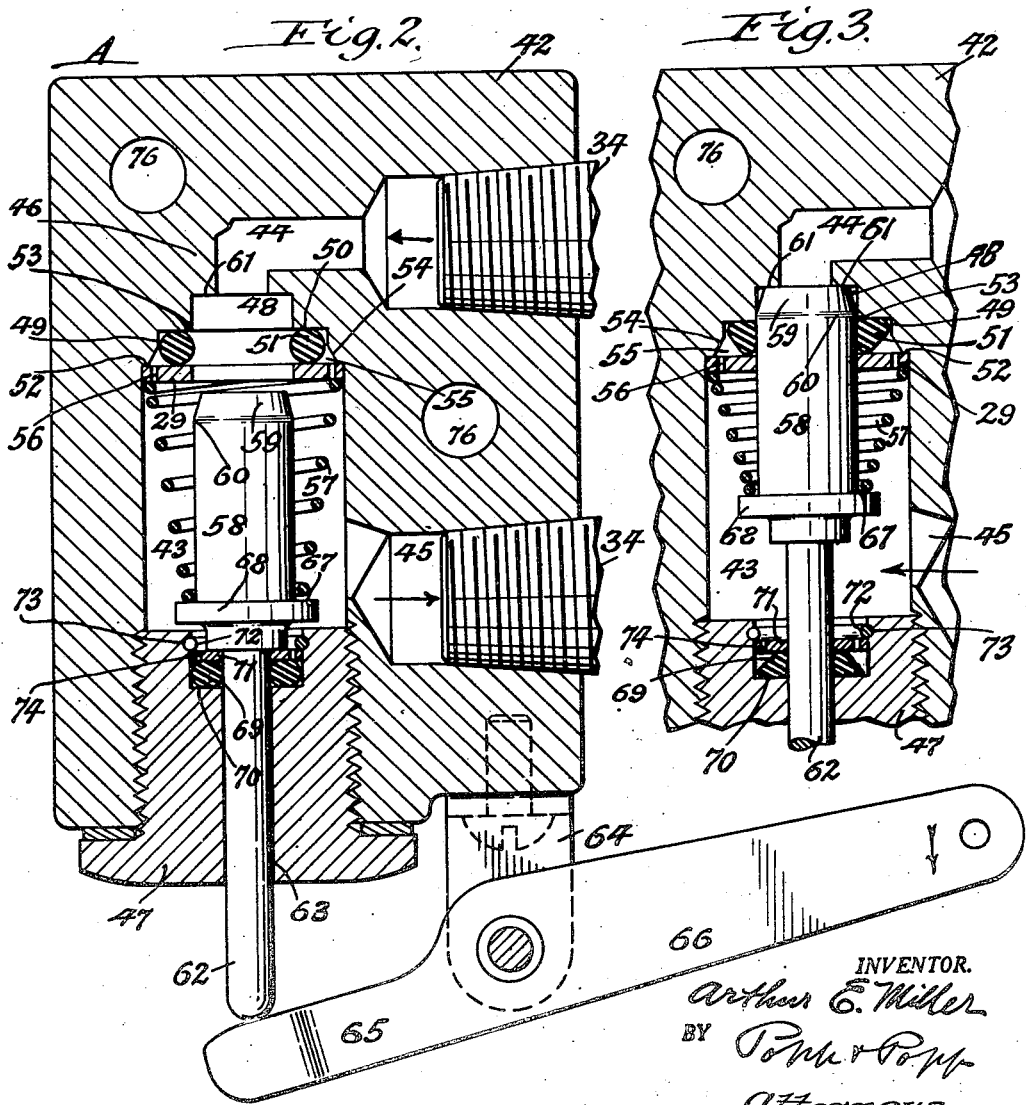
INVENTOR.
Arthur E. Miller
BY
Pope & Pope
Attorneys Nov. 6, 1951  A. E. MILLER  2,574,054
FLUID VALVE
Filed Dec. 2, 1944  5 Sheets-Sheet 2

INVENTOR.
Arthur E. Miller
BY
Attorneys

Nov. 6, 1951     A. E. MILLER     2,574,054
FLUID VALVE
Filed Dec. 2, 1944     5 Sheets-Sheet 3
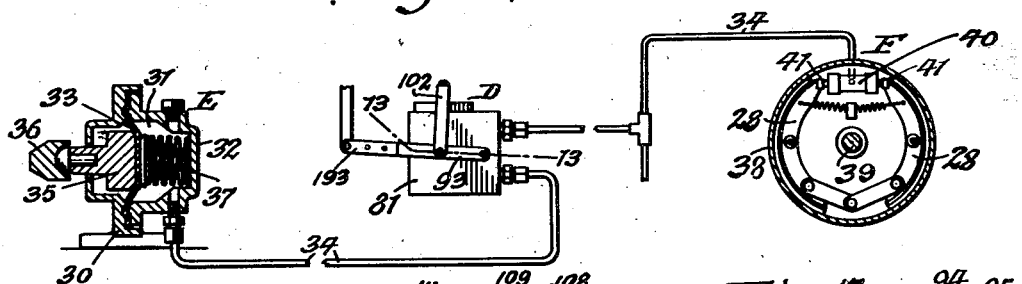
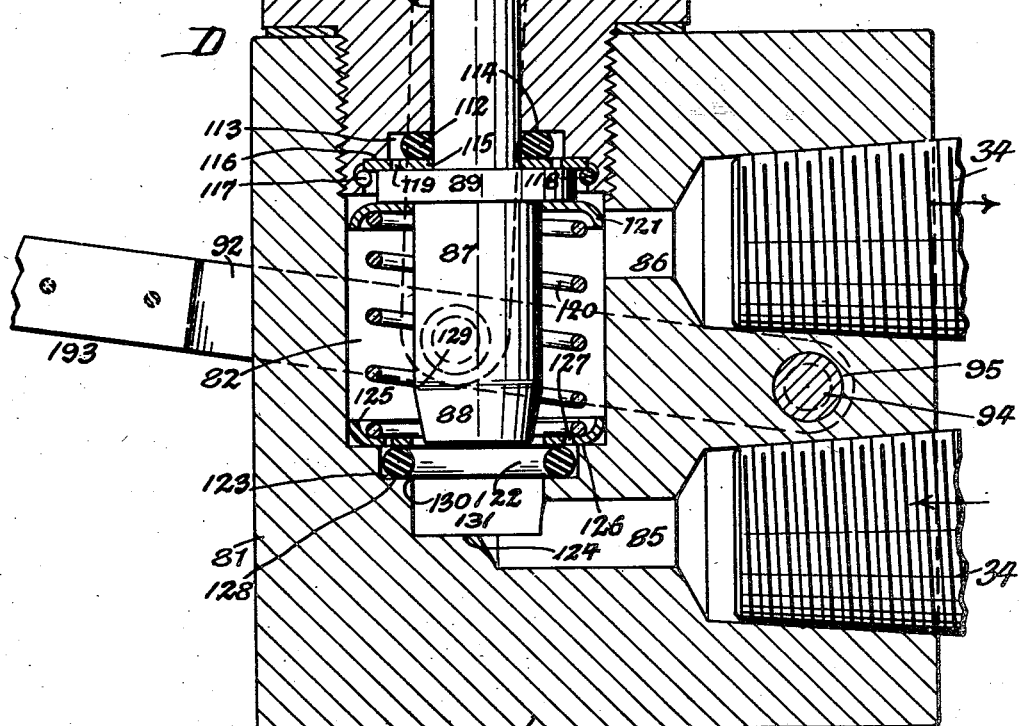
INVENTOR.
Arthur E. Miller
BY
Attorneys

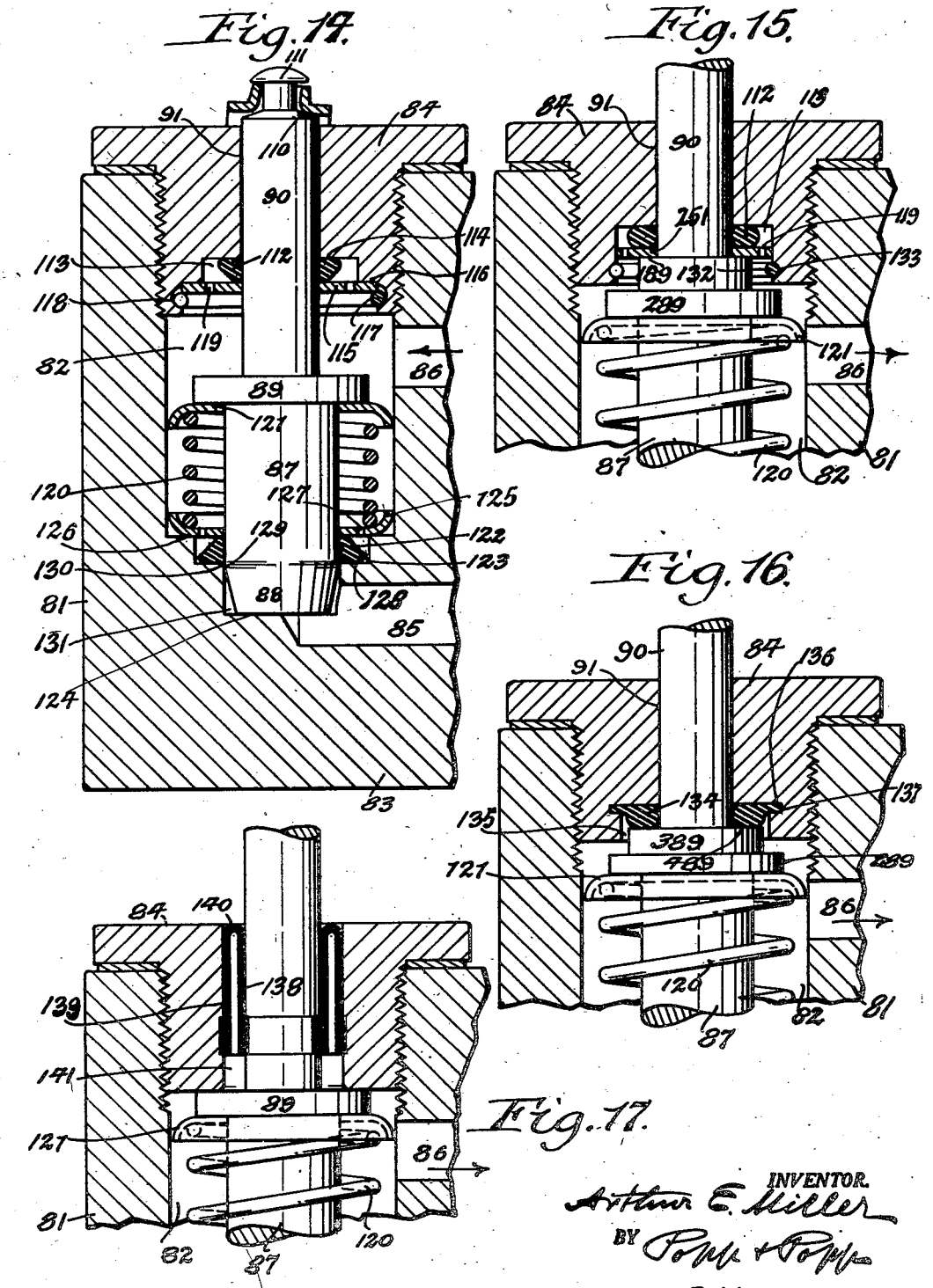

Nov. 6, 1951     A. E. MILLER     2,574,054
FLUID VALVE
Filed Dec. 2, 1944     5 Sheets-Sheet 5
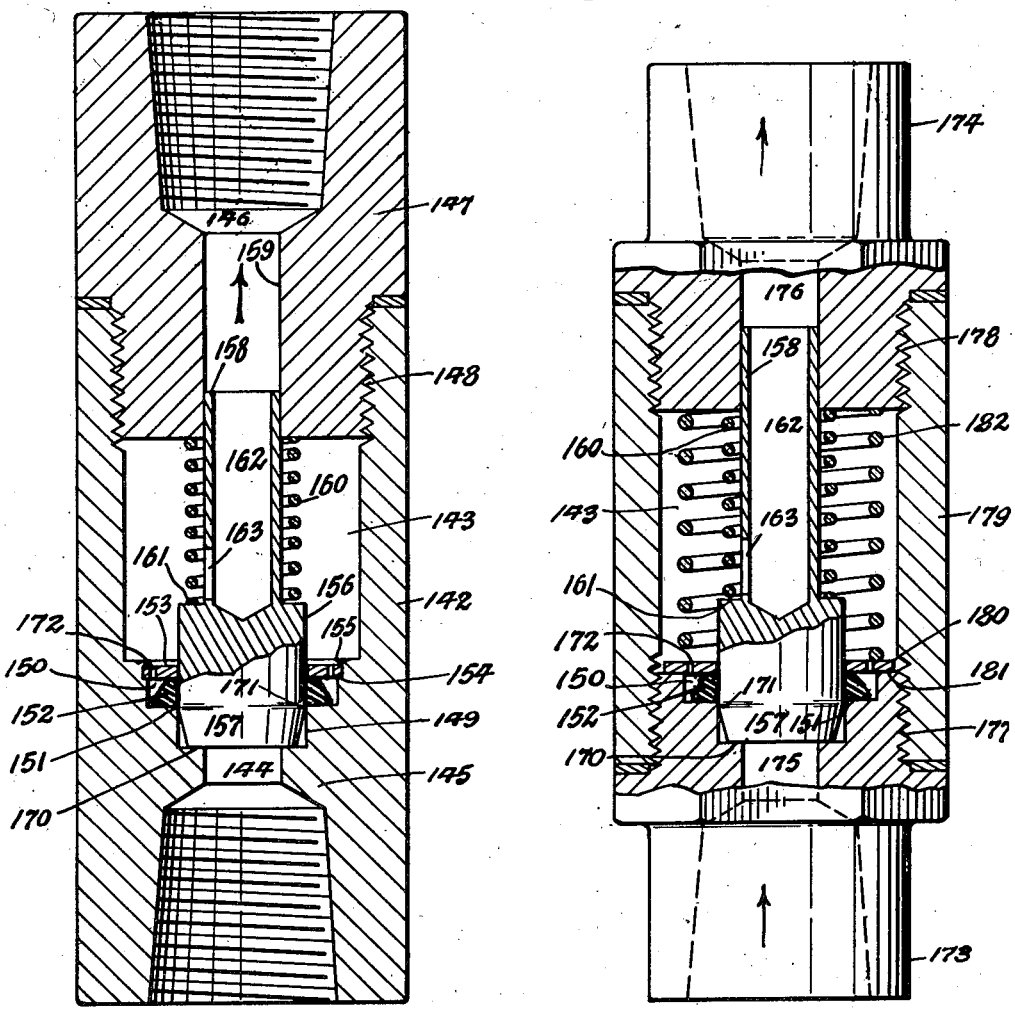
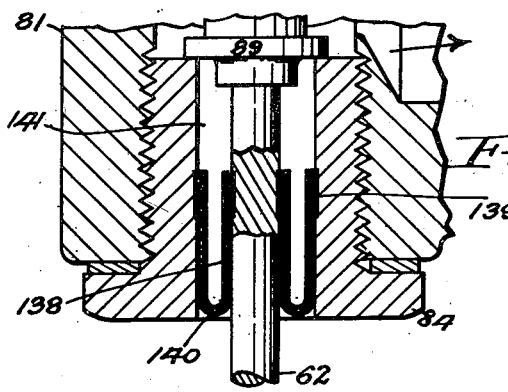
INVENTOR.
Arthur E. Miller
BY
Attorneys Patented Nov. 6, 1951

2,574,054

UNITED STATES PATENT OFFICE 2,574,054

FLUID VALVE

Arthur E. Miller, Kenmore, N. Y., assignor to Scott Aviation Corporation, Lancaster, N. Y., a corporation of New York Application December 2, 1944, Serial No. 566,305

1 Claim. (Cl. 251—27)

This invention relates to a check valve mechanism which is more particularly intended for use in connection with the hydraulic parking brake mechanism of airplanes to prevent movement of the same when standing but may also be employed advantageously in other installations.

Heretofore, this check valve mechanism has comprised a conventional valve, valve seat, and valve stem packing. This involved an inordinately high cost of production, because of the necessity of accurately aligning said valve and its valve seat, and, even when well constructed, such a check valve mechanism was likely to leak after a certain period of service, due to pitting or other mechanical deformation of the valve, and/or its seat, and also the leakage around the valve stem. This leakage becomes greater as the pressure becomes greater, and, as the pressures actually used are relatively high, it follows that such a valve had to be frequently serviced or replaced. This matter of leakage is particularly detrimental in an airplane, because the factor of weight being very important, practically all airplanes which are provided with hydraulic brakes have no mechanical, auxiliary, parking brake, as in conventional automobile practice. And, because liquid is incompressible, a small amount of leakage causes the hydraulic brakes to be completely released, and the airplane deprived of its "parking" brakes at the very time when it is most likely to be unattended.

The object of the present invention is to provide a valve mechanism which will not only not leak, at low pressures, but will be even less likely to leak at high pressures, and in neither case will leak, even though the airplane is left unattended for a long period of time, with its hydraulic brakes held in locking position by the valve mechanism of the present invention.

In the accompanying drawings:

Fig. 1 is a side elevation, on a reduced scale, showing one form of this invention in connection with a foot operated fluid compressor and a hydraulic brake mechanism.

Fig. 2 is a vertical longitudinal section, on an enlarged scale, of the check valve mechanism shown in Fig. 1, and showing the check valve open.

Fig. 3 is a fragmentary view of the same showing the check valve closed.

Figure 8:
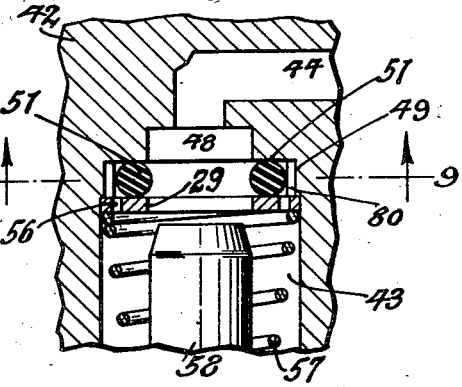
Fig. 8 is another modification of the construction of the check valve seat.
Figure 9:
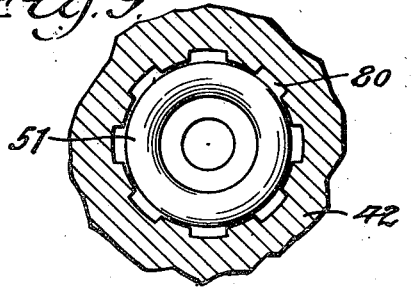

Fig. 9 i a horizontal section taken on line 9—9, Fig. 8.

Fig. 10 is a side elevation, on an enlarged scale, showing another form of the valve operating mechanism as compared with Fig. 1.

Fig. 11 is a top plan view of the valve operating mechanism shown in Fig. 10.

Fig. 12 is a vertical longitudinal section, on an enlarged scale, of the check valve mechanism shown in Fig. 10, and showing the valve open.

Fig. 13 is a fragmentary horizontal section, on an enlarged scale, taken on line 13—13, Fig. 10.

Fig. 14 is a fragmentary view similar to Fig. 12 but showing the check valve closed.

Figs. 15, 16 and 17 are alternate forms of means for packing the joint between the plunger rod or stem and the body of the check valve mechanism.

Fig. 18 is a longitudinal section of a check valve mechanism which embodies some features of this invention and capable of general use as a check valve for automatically permitting the flow of fluid in one direction but preventing flow in the opposite direction.

Fig. 19 is another form of this invention of the type shown in Fig. 18.

Fig. 20 is a fragmentary longitudinal section showing a joint packing similar to that in Fig. 17 but in an inverted position.

In the following description similar reference characters indicate like parts in the several figures of the drawings.

In Fig. 1 the check valve mechanism is represented generally by the letter A in connection with a fluid compressor B and a brake mechanism C forming part of the means for parking an airplane. As there shown the fluid compressor includes a body or housing 30 which is mounted on the fuselage of an airplane within the aviator compartment and provided with a compression chamber 31 containing an actuating or transmission fluid, such as oil or other suitable liquid, which is adapted to be expelled by force from the compression chamber to the brake mechanism for applying the latter and to be returned to this chamber from the brake mechanism upon releasing the latter. This chamber is formed between a rigid wall 32 of the body and a flexible diaphragm 33 secured to the body and movable toward and from this wall. The transmission liquid is carried to and from the brake mechanism by a pipe or conduit 34 with which the check valve mechanism A is connected in series. Expulsion of the pressure liquid from the compression chamber to the brake mechanism for applying the latter is effected by moving the diaphragm 33 toward the wall 32 of the chamber, this being accomplished by a plunger 35 engaging the outer side of the diaphragm and moved rearwardly or inwardly by a pedal 36 which is operated by the foot pressure of the aviator. Upon releasing the foot pressure on the pedal the diaphragm is moved forwardly or outwardly by a spring 37 interposed between the diaphragm and this body wall, whereby the pressure liquid is again returned to the compressor from the brake mechanism and the latter is released.

The brake mechanism C may be variously constructed, that shown in Fig. 1 as a suitable example comprising a brake drum 38 secured to the axle 39 of one of the supporting wheels of the fuselage, brake shoes 28 adapted to move toward and from the inner side of the brake drum, and a fluid motor having a cylinder 40 communicating with the pressure fluid transmission pipe 34 and containing pistons 41 which are connected with the brake shoes. When the pressure fluid is forced into the cylinder 40 the brake shoes are expanded into engagement with the brake drum so as to arrest the rotation of the latter and hold the airplane against movement and when this liquid is withdrawn from this cylinder the brake shoes are permitted to relax and withdraw from the brake drum, thereby permitting the latter to rotate and the airplane to move.

That embodiment of this invention shown in Figs. 1–5 is constructed as follows:

The numeral 42 represents the housing or body of the check valve mechanism which contains a valve chamber 43 having a pressure liquid inlet 44 opening into the upper part of its side and a pressure liquid outlet 45 opening into the lower part of this chamber, said inlet and outlet being connected with sections of the liquid conduit 34 so that the valve chamber is in series with this pipe. The integral top 46 of the valve body forms a head for the upper end of the valve chamber 43 and the lower end of the latter is closed by a plug or bushing 47 which is connected by a screw joint with the lower part of the valve body.

The numeral 48 represents a fluid inlet valve port arranged in the upper head 46 of the valve body at the upper end of the valve chamber and concentric with the axis of the latter and forming a part of the fluid inlet 44. Around the inner end of this port the valve body is counterbored to form a concentric cylindrical enlargement 49 of this port which provides an inwardly facing shoulder 50. Within this counterbore is arranged an elastic valve ring 51 of rubber or the like which engages its upper side with said shoulder 50 and which in its undeformed condition is round in cross section and generally known as an O ring. The under or inner side of the valve ring is engaged by a retaining ring or washer 29 which also engages the marginal part of its upper side with a downwardly facing annular shoulder or seat 52, formed in the upper part of the valve chamber between the bore thereof and the valve ring shoulder or seat 50. The diameter of the port 48 is somewhat more than the normal internal diameter of the valve ring 51 and the junction between the bore of the port 48 and the shoulder 50 below the same forms a right angle corner 53. The junction between the lower part of the enlarged bore 49 and the shoulder 52 below the same is made of downwardly flaring form 54 to provide an annular pressure chamber 55 in the valve body around the valve ring 51. This pressure chamber communicates with the interior of the valve chamber 43 by means of one or more holes 56 formed in the retaining washer. The latter is held in engagement with the valve ring 51 and the shoulder 52 on the body by a spring 57 which is arranged in the valve chamber and preferably of helical downwardly tapering or truncated form and bears with its large upper end against the underside of the retaining washer 29, as shown in Fig. 2.

The numeral 58 represents the cylindrical body of a check valve which is arranged concentrically within the valve chamber and adapted to be reciprocated lengthwise therein for engaging the same with and disengaging the same from the bore of the valve ring 51 for closing and opening the passage through the valve body. The upper end portion of the check valve is of upwardly coned form and has a straight taper, as shown at 59 in Figs. 2 and 3, and this tapering surface is joined with the upper end of the cylindrical periphery of the check valve body by a short annular rounded or convex surface 60. While the check valve is in its lowered position, as shown in Fig. 2, the same is out of engagement with the valve ring 51 and the passage through the check valve body is open from its inlet 44 to its outlet 45. Upon raising the check valve to its highest position the same passes through the opening in the retaining washer 29 and the valve ring 51 until its upper end engages with an annular stop face 61 formed around the port 48 by a contraction in the same above the valve ring seat 50. During this upward movement of the check valve its tapering face 59 and convex face 60 pass through the valve ring 51 and center the latter relative to the check valve and then the check valve comes to rest with the upper part of the cylindrical periphery of the check valve loosely engaging the bore of the port 48 immediately above the corner 53 between this port and the valve ring seat 50, as shown in Fig. 3, thereby closing the passage through the valve body.

While the check valve is in this closed position the fluid under pressure in the valve chamber 43 passes from the latter through the holes 56 in the retaining ring 29 into the annular pressure space 55 and exerts an inward and longitudinally outward pressure on this valve ring which causes the same to change from the round cross section shown in Fig. 2, to the triangular cross section shown in Fig. 3, and bear firmly against the cylindrical periphery of the check valve and also against the flat seat or shoulder 50 of the valve body so as to produce a leak-tight joint between the check valve and the check valve body which will prevent backward flow of fluid through the valve body from its outlet 45 to its inlet 44. The check valve is guided in its longitudinal movements by a longitudinal valve stem 62 projecting downwardly from the center of its lower end and sliding in an axial guide opening 63 formed in the bushing 47 on the underside of the valve body. Closing of the check valve is preferably effected by means of a manually operated lever pivoted on a bracket 64 depending from the underside of the body 42 and having an inner arm 65 engaging with the lower end of the valve stem 62 and an outer arm 66 which may be operated either by the foot or the hand of the aviator in any suitable manner. The check valve is yieldingly held in its downward or open position by engagement of the lower smaller end of the conical spring 57 with a shoulder 67 formed by the upper side of a collar 68 arranged on the value stem within the lower part of the valve chamber, as shown in Fig. 2. The diameter of the check valve body 58 and collar 68 is sufficiently greater than that of the valve stem 62 so that when this check valve is closed manually it will be held closed by the back pressure against the rear or underside of the same so long as this back pressure predominates over the pressure against the front or upper side of this valve.

A fluid-tight joint of any suitable character may be employed between the valve stem and the bushing of the valve body but that shown in Figs. 2 and 3 is preferred and constructed as follows:

The numeral 69 represents a packing ring of rubber or similar flexible material arranged in an annular pocket 70 formed by counterboring the upper end of the bushing 47 and surrounding the valve stem. Normally this packing ring is round in cross section, similar to an O ring, but when installed in this apparatus the same is compressed into oval form in cross section and bears with its inner side against the periphery of the valve stem 62 and with its outer side against the bore of the pocket 70 and thus aids in forming a fluid leak-tight joint between the valve stem and the bushing. The packing ring 69 is held in this compressed form by means of a detaining ring or washer 71 which is arranged in the pocket 70 and surrrounds the valve stem below its collar 68 and bears against the upper or inner side of the packing ring. This washer is held down on the packing ring by a split locking ring 72 engaging with the upper side of this retaining washer and engaging with an internal groove 73 formed in the peripheral wall of the pocket 70. The washer 71 is provided with one or more holes 74 adjacent to its margin which place the interior of the valve chamber 43 in communication with the space in the pocket 70 around the periphery of the packing ring 69, whereby the fluid pressure on the outlet side of the check valve mechanism will operate to press this packing ring radially inward against the valve stem 62 and also against the bottom of the pocket 70 and thus aid in forming a fluid-tight joint between the valve stem and the valve chamber of this apparatus.

*Operation*

When the parts of the parking check valve mechanism are in the position shown in Fig. 2 the passage through the valve body is open and the pressure liquid is free to flow through the same in either direction.

If now it is desired to apply the brake mechanism the aviator applies foot pressure on the pedal lever 36 so as to push the plunger 35 forwardly or inwardly whereby the diaphragm is moved in the same direction and the return spring 37 is increasingly compressed. This forward movement of the diaphragm causes the pressure liquid to be expelled from the pressure chamber 31 and forced through the pipe 34 and the check valve body 42 into the brake cylinder 40, whereby the brake shoes 28 are expanded against the brake drum 38 and the latter, together with the landing wheels operatively connected therewith, are held against movement. Upon removing the foot pressure against the pedal lever 36 the spring 37 moves the diaphragm and plunger outwardly or backwardly, thereby allowing the pressure fluid to flow backwardly from the brake cylinder 40 through the pipe 34 and the check valve body into the pressure chamber 31, whereby the brake shoes are withdrawn from the brake drum and the latter is released and the landing wheels are free to turn.

If it is desired to lock the brake mechanism so that the drum and landing wheels cannot turn, as is necessary for parking the airplane or for other purposes, the aviator pushes the foot lever 36 inwardly so as to force the liquid from the compresion chamber 31 through the check valve chamber 43 and to the brake mechanism for applying tht latter and while this liquid is still under pressure the aviator also operates the lever 65, 66 manually so as to raise the check valve 58 from its lower or retracted position, shown in Fig. 2, to its elevated or projected position, shown in Fig. 3, whereby the parking valve mechanism is closed and commuication is cut off between the liquid compressor and the brake mechanism. After the parking check valve 58 has been thus closed the aviator maintains the closing pressure on the same long enough to permit him to take the foot or manual pressure off the diaphragm 33. When this occurs the liquid pressure on the inlet side 44 of the check valve chamber 43 drops below the liquid pressure on the outlet side 45 of the same. The brake mechanism will now be held in a set or applied condition even though the aviator removes the operating pressure against the diaphragm owing to the difference in the larger area at the lower end of the valve body 58 and its collar 68 and the smaller area of the valve stem 62 which are exposed to the backward pressure of the liquid interposed between the check valve chamber 43 and the brake mechanism.

For the purpose of releasing the brake mechanism it is only necessary to push the diaphragm 33 inwardly sufficiently to produce a liquid pressure on the inlet end 44 of the check valve chamber which is equal to or exceeds the liquid pressure on the outlet end 45 of the same and when this occurs the check valve 58 will instantly be moved into its open position by the spring 57 and the difference in cross sectional area between the check valve body 58 and its stem 62 and thereby again restore liquid communication between the brake cylinder 40 and the pressure chamber 31. Thereafter the aviator removes the inward pressure against the diaphragm and in so doing the pressure liquid flows backwardly from the brake mechanism, through the valve chamber 43 and to the pressure chamber and permits the brakes to be released automatically without requiring the aviator to operate any part of the parking check valve mechanism.

The valve stem packing ring 69 is normally round in cross section but when the same is secured in its pocket 70 in the bushing 47 it is compressed slightly between the bottom of this pocket and the retaining washer 71 so as to deform the same into oval shape in cross section, as shown in Figs. 2 and 3, whereby this packing ring is caused to engage the periphery of the valve stem sufficiently tight to form a liquid-tight joint between this stem and the check valve chamber 43 to prevent the escape of any liquid to the exterior of the instrument when the brake mechanism is not in use. When the locking mechanism is not in use the liquid pressure in the valve chamber 43 presses downwardly on the collar 68 of the valve stem 62 and causes the underside of this collar to press the washer 71 downwardly against the packing ring 69 and squeeze the same to a greater extent into oval form and thus more effectively seal the joint between this stem and the bushing 47 which forms a part of the valve body 42 for preventing leakage of liquid from the chamber 43. Such an organization is advantageous because O rings of this character do not always return to their initial shape if the same are unduly stressed, and it is therefore possible, by providing just enough constant stress, to prevent leakage under low pressure as well as under high pressure. An increase in the firmness of the engagement of this packing ring with the valve stem 62 and the bottom of the pocket 70 for further preventing leakage between the same under the heaviest loads is assured by the admission of the pressure liquid through the holes 74 in the washer 71 into the pocket 70 around the outer surface of this packing ring, thereby maintaining this apparatus indefinitely in good working condition and avoiding the necessity of undue frequent inspection or servicing of the same.

When the check valve body is in its lowered or open position, as shown in Fig. 2, the port 48 is uncovered and permits the pressure liquid to flow freely back and forth through the passage in the check valve body. Upon operating the lever 65, 66 so as to raise this check valve into its highest position its upper end first passes through the retaining washer 29 and the valve ring 51 and is arrested by engagement of its upper end with the stop surface 61 on the body 42, during which time the spring 57 is increasingly compressed. When the valve has reached its highest position, as shown in Fig. 3, the conical upper part 59 is wholly within the port 48 and an annular channel or gap of downwardly reducing form is produced between this tapering surface of the valve and the peripheral wall of this port, the lower corner 53 of which is engaged by the lowermost end part of the conical portion 59 when this valve is closed. After the valve 58 has been raised into its highest or closed position the liquid under pressure in the valve chamber 43 passes through the openings 56 in the retaining washer 29 and into the annular chamber 55 around the peripheral part of the valve ring 51 and presses the latter radially inward against the valve 58 and also longitudinally upward against the shoulder or seat 50 of the pocket containing this ring, whereby the latter is pressed into triangular form in cross section, as shown in Fig. 3, and tightly seals the joint between the periphery of the cylindrical surface of the valve body 58 and the corner 53 at the lower end of the port 48 and thus effectually prevents any leakage of compressed liquid therethrough so that the brake mechanism is reliably held in its locked position. Upon withdrawing the valve 58 from the valve ring 51 the high liquid pressure is again equalized on all sides of the same thus permitting it, due to its resilience, to again resume its round cross sectional form.

When the liquid in the valve chamber 43 is under comparatively low pressure the valve ring 51 will not appreciably deform from a round cross section but this ring will still bridge the joint between the cylindrical surface of the valve 58 and the corner 53 to prevent leakage therethrough under low pressure.

The body 42 of the valve is provided with holes 76 which permit the same to be mounted either individually in any desired position on a wall of the cockpit of the airplane and also permits of assembling a plurality of units to suit the requirements of different installations. If a plurality of locking devices of this character are employed the same may be controlled individually or a plurality of operating levers 65, 66 may be interconnected in any suitable manner and operated from a single control member.

By using flexible O rings for obtaining a valving action and as a packing the construction is materially simplified and a material reduction in cost is also effected because these rings can be readily replaced when the same become unduly worn.

The truncated shape of the spring 57 is particularly desirable inasmuch as this form permits of easily centering itself without interference with the movement of the check valve 58.

Figure 4:
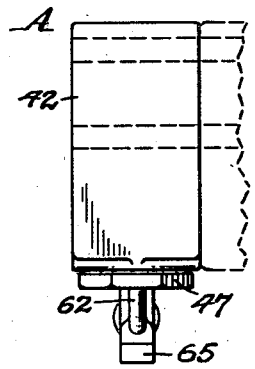
Fig. 4 is a front end elevation of the check valve mechanism shown in Figs. 1 and 2.
Figure 5:
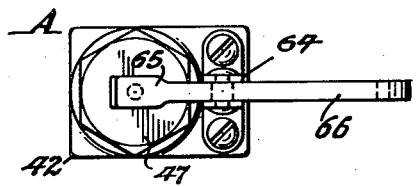
Fig. 5 is a top plan view of the same.
Figure 6:
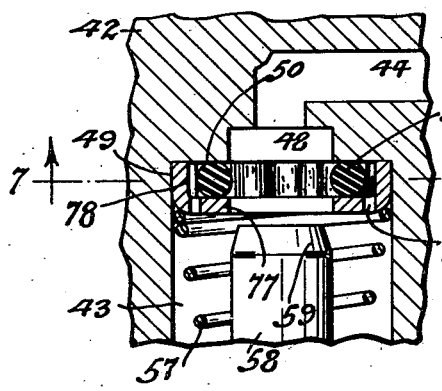
Fig. 6 is a fragmentary vertical section showing a modified form of the valve seat of the check valve as compared with the form shown in Figs. 2 and 3.
Figure 7:
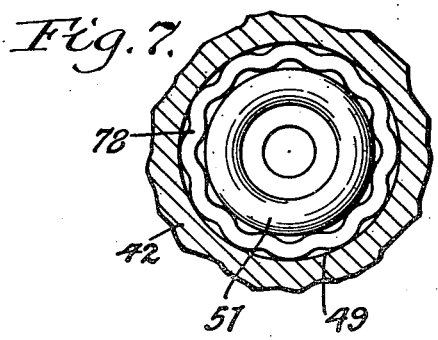
Fig. 7 is a horizontal section, taken on line 1—1 Fig. 6.

Instead of using the perforated washer 29 for holding the valve ring 51 in place this may be accomplished by the alternate means which are shown in Figs. 6 and 7 and which comprise a retaining washer 77 bearing against the under or inner side of this valve ring and provided at its outer edge with an upwardly projecting corrugated flange 78 interposed between the periphery of this ring and the wall of the counterbore 49 containing the same and the washer 77 having holes 79 between the periphery of this valve ring and the flange of the retaining washer.

In the modified construction shown in Figs. 8 and 9 the valve ring 51 is held in place with the counterbore 49 by a perforated retaining washer 29 similar to that shown in Fig. 2 and the longitudinal wall of this counterbore is provided with longitudinal grooves 80 whereby the pressure liquid is carried around the periphery of the valve ring. The constructions of valve ring retaining means shown in Figs. 6–9 function similar to those shown in Figs. 2 and 3. In the modification of this invention shown in Figs. 10–13 the mechanism is reversed from that shown in Figs. 1–9 and is constructed as follows:

The numeral 81 represents the body of a parking or check valve mechanism D for holding the brake mechanism of an airplane in a locked condition and containing a valve chamber 82 which has an integral lower head 83, a removable upper head or bushing 84, a lower inlet 85 for a liquid under pressure supplied by a liquid compressor E and an upper liquid outlet 86 communicating with the brake mechanism F of the airplane.

The liquid compressor E and the brake mechanism F may be the same as those shown in Fig. 1 and the description and reference characters of the latter are therefore applicable to the construction shown in Fig. 10 so far as the liquid compressor and the brake mechanism are concerned. Within the valve chamber 82 is arranged a vertically reciprocable liquid holding or check valve which has a cylindrical body 87, a downwardly tapering face 88 at its lower end and a collar 89 at its upper end. This valve is mounted on the lower end of a valve stem 90 which slides vertically in a guide opening 91 in the head 84 and which is of smaller diameter than the valve body 87 and its collar 89. Reciprocation of this valve together with its collar and stem is effected by an operating device which includes a vertically swinging operating lever comprising two substantially Z shaped sections the webs 92 of which are connected to form a cross bar, two front bars or branches 93 projecting outwardly from the inner ends of the webs and forming the outer arm of the operating lever and two inner bars or branches 94 projecting inwardly from the outer ends of the webs and forming an inner forked arm for this lever, as shown in Figs. 10 and 11. The outer arm of this lever is adapted to be depressed by the foot pressure of the aviator in the cockpit of the airplane, either directly or any other suitable manner, and the inner ends of the fork branches 93 are arranged on opposite longitudinal sides of the valve body 81 and pivoted thereto by a pivot pin 94 passing through a transverse bearing opening 95 in the valve body 81 and having its opposite ends connected with the inner ends of the fork branches 93 by forming reduced necks 96 on opposite ends of this pivot pin which pass through openings in the inner ends of the branches and securing each of the latter to the outer end of the respective branch 93 by interposing a washer 97 between the inner side of this branch and the shoulder 98 formed between the body and the neck 96 of the pivot pin and upsetting or riveting the outer end of the neck against the outer side of the respective lever branch as shown at 99 in Fig. 13.

The upper end of the valve stem 90 may be connected in various ways with the operating lever but this is preferably accomplished by the means shown in Figs. 10–14 and constructed as follows:

The numeral 101 represents the horizontal cross bar of a coupling yoke which extends transversely over the valve body 81 and provided at its opposite ends with depending legs 102 arranged along opposite longitudinal sides of this body. Each of these legs is pivotally connected with one of the inner branches 93 of the operating lever by a rivet having a small diameter part 103 passing through an opening in the respective lever branch 93 and a large diameter part 104 passing through an opening in the respective leg of the coupling yoke, and heads 105, 106 formed by upsetting the opposite ends of this rivet into engagement with the outer sides of said branch and leg, as best shown in Fig. 13. A loose pivotal connection is formed between the upper end of the valve stem 90 and the central part of the yoke cross bar 101 by providing the central part of the yoke cross bar with an opening 107 which is preferably formed therein by displacing the material from this bar upwardly to produce an annular rim 108 on this bar around the opening 107 and providing the upper end of the valve stem with a reduced neck 109 which is arranged in the opening 107, a shoulder 110 at the inner end of said neck which bears against the underside of the yoke cross bar, and a head 111 at the upper end of this neck which bears against the upper edge of the ring.

As the parking check valve rises and falls with the operating lever 93, 193 the legs of the yoke rock on each rivet 103, 104 and its cross bar 101 rocks on the neck 109 of the valve stem 10 without producing any binding effect.

A liquid-tight joint is produced between the valve stem 90 and the upper head 84 of the body by means which are preferably constructed as follows:

The numeral 112 represents an O packing ring of rubber or similar flexible material which is normally round in cross section and surrounds the valve stem 90 within a counterbore 113 around the inner end of the guide opening 91. This packing ring is held in a partly compressed condition so that it bears tightly against the periphery of the stem 90 by clamping the same between the bottom 114 of the counterbore 113 and a retaining washer 115 which surrounds this stem and bears against the inner side of this packing ring. The compression of the latter by this retaining ring is limited by engaging the outer edge part of this washer with an annular stop shoulder or ledge 116 around the counterbore 113. This washer is held in this position by a split snap ring 117 arranged in an annular groove 118 on the head 84 below the shoulder 116 and bearing against the underside of the retaining washer. The upward movement of the valve 87 is limited by engagement of its collar 89 with the inner side of the retaining washer 115, as shown in Fig. 12, but when this valve is lowered, as shown in Fig. 14, the collar 89 is moved away from the underside of the retaining washer and uncovers holes 119 in the latter whereby liquid under pressure is admitted to the counterbore 113 around the packing ring 112 and causes the latter to be pressed with increasing force against the stem 90 and prevent leakage between the same and the bore of the guide opening 91.

Lifting of the parking check valve 87 when free is effected by a helical spring 120 surrounding this valve and bearing at its upper end against a cup-shaped washer 121 engaging with the underside of the collar 89 on this valve, as shown in Figs. 12 and 14. When the parking check valve is lowered to its fullest extent, communication is cut off between the valve chamber 82 and the inlet 85 by means which cooperate with the valve 87 and which are constructed as follows:

The numeral 122 represents an O type valve ring of rubber or similar flexible material which is normally round in cross section and arranged in a counterbore 123 formed on the bottom of the valve chamber 82 around the inner end of the inlet port 85 and concentrically with the valve 87 and said ring 122 resting on the bottom 128 of said counterbore 123. This valve ring rests with its underside against the bottom 124 of this counterbore and is held thereagainst by a cup-shaped washer 125 which is pressed against the valve ring 122 by the lower end of the spring 120 bearing against the upper side of the washer 125. The washer 125 rests on a ledge 126 formed on the interior of the valve body 81 around the upper end of the counterbore 123. Liquid under pressure is permitted to flow from the valve chamber 82 into the space of the counterbore 123 around the valve ring 122 through one or more holes 127 in the lower cup washer 125.

In the elevated position of the parking check valve 87, shown in Fig. 12, the passageway through the valve body is open and communication is established between the liquid inlet 85 and the liquid outlet of this valve mechanism. While the parts are in this position pressure on the foot lever 36 of this apparatus causes liquid under pressure to be forced from the compression chamber 31 forwardly through the conduit 34 and the valve body 81 to the hydraulic cylinder 40 of the brake mechanism and apply the brake shoes 28 for stopping rotation of the parts which they act upon. When the aviator removes the pressure on the compressor lever 36, the spring 37 moves the diaphragm 33 backwardly and allows the pressure liquid to flow backwardly from the brake cylinder 40, through the conduit 34 and valve body 81 and into the compression chamber 31, thereby withdrawing the brake shoes 28 and permitting the parts which they controlled to rotate.

If the aviator desires to hold the brake mechanism in a locked position after the same has been applied, the locking lever 93, 193 is turned by him so as to shift the parking check valve 87 from its elevated inoperative position shown in Fig. 12 to its lowered operative position which is limited by engagement of the lower end of this valve with the stop 124 on the valve body below the counterbore 123, as shown in Fig. 14. During its downward movement the check valve 87 increasingly compresses the spring 120 and its lower end passes downwardly through the valve ring 122 and engages its cylindrical periphery with the bore of this ring, this movement of the valve through the valve ring being facilitated by rounding the corner 129 on this valve between its tapered lower end portion 88 and its cylindrical upper body portion 87. When the check valve reaches its lowermost position the lower part of its cylindrical surface engages the corner 130 between the inner part of the counterbore 123 and the counterbore 131 of smaller diameter which forms the inner part of the inlet 85, as shown in Fig. 14. While the valve 87 is in this lowered position the same cuts off communication between the inlet 85 and the valve chamber 82 and the aviator removes his foot pressure from the foot lever 36, thereby lowering the pressure on the inlet side 85 of the valve chamber 82 but maintaining the higher pressure on the outlet side 86 of the same due to the diameter of the valve 87 being greater than the diameter of its stem 90 which are subject to the same liquid pressure in the valve chamber, whereby this valve is held in its closed position, as shown in Fig. 14. After the lower cylindrical part of the valve 87 engages with the bore of the valve ring 122 the latter is pressed inwardly against the peripheral surface of the valve 87 by the passage of pressure liquid from the valve chamber 82 through the openings 127 in the retaining washer and into the space in the counterbore 123 around the valve ring 122, thereby producing a tight joint between the valve and the body of the valve chamber which prevents the liquid in the brake mechanism from leaking back into the valve chamber and thus holding the brake mechanism securely in its locked position.

When it is desired to unlock the brake mechanism it is only necessary for the aviator to apply sufficient pressure against the foot lever 36 of the liquid compressor to produce a pressure in the valve chamber 82 which equals or exceeds that in the piping between the valve chamber 82 and the brake cylinder 40 and when this occurs the valve spring 120 instantly raises the valve 87 into its open position so that the pressure liquid can flow backwardly from the brake cylinder through the piping and locking valve chamber 82 to the liquid compressor.

It is to be noted that when the packing rings 112 and 122 are subjected to high liquid pressure around the periphery thereof, the same may be converted more or less into right angle triangular form in cross section, as shown in the upper part of Fig. 14, and when the valve ring is not subjected around its periphery to a very high pressure while the check valve is in its open position this packing ring may retain a substantially round form in cross section, as shown in the lower part of Fig. 12. The advantages inherent in the construction shown in Figs. 10, 11 and 12 are that the control lever 193 and the plunger 90 and the parts connected therewith move in the same direction whereby the position of this lever and any operating means connected therewith, such as a cable, wire or other means, can be used as an indicator for determining from the exterior of the casing 81 whether the valve 87, 98 is open or closed.

If desired the packing means between the valve stem 90 and the head 84 of the valve body may be so organized that the upward pressure of this spring 120 is utilized to compress the packing 112, as shown in Fig. 15, in which case the retaining washer 251 is arranged in the counterbore 113 containing the packing ring 112 and is adapted to be moved outwardly by the shoulder 189 of a collar 289 of the check valve 87 but is limited in its inward movement in said counterbore by a stop consisting of a split ring 132 which is snapped into a groove 133 in the side wall of this counterbore.

The modified means for accomplishing this purpose, as shown in Fig. 16, consist of a packing ring 134 of rubber or other flexible material surrounding the valve stem 90 and arranged within a counterbore 135 on the respective head 84 and adapted to be compressed between the bottom of this counterbore and the shoulder 489 of a collar 389 of the check valve 87 and held against axial displacement by an annular flange or fin 136 on the periphery of the valve ring 134 engaging with an annular groove 137 formed in the side wall of the counterbore 135.

Another way of accomplishing this purpose shown in Fig. 17, comprises a flexible telescopic packing tube having inner and outer sections 138, 139 connected at one of their corresponding ends by a turn 140 and the inner section 138 being connected at its free edge with the adjacent part of the valve stem 90 while the free edge of the outer section is connected with the opening 141 in the head 84 through which the valve stem extends. As the valve 87 and the stem 90 reciprocate, the sections of the telescopic packing tube move lengthwise one relative to the other and maintain a sealed joint between the valve stem and the body of the valve chamber 82. In Fig. 17 this telescopic tubular packing is shown applied to a valve mechanism when the valve stem is at the upper end of the check valve corresponding to the construction shown in Figs. 12 and 14, and in Fig. 20 this form of packing is shown applied to the valve mechanism when the valve stem is at the lower end of the check valve corresponding to the construction shown in Figs. 2 and 3.

Some structural features of this invention are applicable to a valve device which merely serves the purpose of a check valve mechanism which permits flow of fluid in one direction only and prevents flow of the same in the opposite direction, organizations of this character being shown in Figs. 18 and 19.

The form of check valve shown in Fig. 18 is constructed as follows:

The numeral 142 represents the body of a check valve device which contains a valve chamber 143, a lower fluid inlet 144 formed in an integral head 145 on the body and an upper outlet 146 formed in a head 147 which is removably attached to the body by a screw joint 148.

The lower head is provided with a comparatively small outer counterbore 149 around the inner end of the inlet 144 and above said outer counterbore with a larger counterbore 150 thereby forming a corner 151 between said counterbores. A valve ring 152 made of rubber or other suitable flexible material and having a substantially round cross section rests on the bottom of said inner counterbore and normally projecting with its bore slightly inwardly over the inner corner 151. This valve ring is held in the counterbore 150 by a retaining ring or washer 153 engaging the inner side of the valve ring and resting on an annular shoulder or ledge 154 formed on the valve body around the inner counterbore, this washer being held against said shoulder by peening the adjacent inner part of the valve body over the inner marginal edge of said washer, as shown at 155 in Fig. 18.

The numeral 156 represents the cylindrical body of a check valve which is movable lengthwise in the valve chamber and provided at its lower end with a downwardly tapering conical face 157 adapted to cooperate with the valve ring 152 and the outer counterbore and also provided at its upper end with a valve stem 158 which slides in a guideway 159 forming the inner part of said outlet 146. The check valve is yieldingly moved downwardly by a spring 160 surrounding the valve stem 158 and bearing at its opposite ends against an external shoulder 161 on the check valve and the inner side of the upper head of the valve body. Downward movement of the check valve 156 is limited by an annular shoulder 170 which is formed by the bottom of the outer counterbore 149 and which is adapted to be engaged by the lower end of the check valve. Communication is established between the interior of the valve chamber 143 and the outlet 146 by a longitudinal passage 162 formed in the valve stem 158 and opening at its upper end into the guideway 159 and an opening 163 extending laterally through the valve stem from the inner end of the passage 162 to the valve chamber 143.

When this check valve device is closed the lower end of the check valve rests on the shoulder 170, the lowermost part of its cylindrical periphery engages with the corner 151 between the inner end of this shoulder and the counterbore 149 and the valve ring 152 engages with the cylindrical periphery of the check valve immediately above the corner 151 and the tapering face 157, as shown in Fig. 18. By making the valve ring 152 so that the normal diameter of its bore is slightly less than the diameter of the cylindrical part of the check valve 156, this ring will be expanded slightly as the tapering part 157 of this valve passes through this valve ring and the cylindrical part of the valve thereafter engages this ring. The corner 171 between the tapering and cylindrical surfaces of the check valve are rounded to avoid tearing of the rubber valve ring. By this means the joint between the check valve and the valve body is sealed and fluid is prevented from passing backward from the outlet side of the valve chamber to the inlet side of the same.

If a fluid pressure exists in the outlet side of the valve chamber which is greater than that on the inlet side of the same this predominating pressure passes from the valve chamber 143 through openings 172 in the retaining washer 153 into the space of the counterbore 150 around the valve ring 152 thereby pressing the latter radially inward against the periphery of the cylindrical surface of the check valve and increasing the sealing effect on the joint between this valve and the body of the valve chamber.

When the fluid pressure on the inlet side of the valve chamber is greater than on its outlet side the check valve will be forced inwardly and out of engagement with the shoulder or seat 170 and the valve ring 152, thereby opening this valve device and permitting fluid to pass from the inlet side of the valve chamber through the opening 163 and passage 162 in the check valve to the outlet side of the chamber. When the pressures on the inlet and outlet sides of the valve chamber are again balanced or the pressure on the outlet side exceeds that on the inlet side thereof, the check valve is again closed automatically by the spring 160.

As shown by full lines in Fig. 18, the upper removable head 147 of the valve body has its outlet 146 arranged axially in line with the inlet 144 but if desired this head may be replaced by one having the outer part of the outlet arranged at an angle relative to the inlet. In the construction shown in Fig. 19, both of the heads 173 and 174 containing the inlet and outlets 175, 176 of the valve chamber 143 are removably connected by screw joints 177, 178 with the body 179 of the valve chamber and both of these are axially in line but may be replaced by heads having their outer parts and the inlet and outlet therein arranged at an angle to the longitudinal axis of the check valve device. The heads 147, 173, 174 of this construction shown in Figs. 18 and 19 may also be replaced by other types, sizes and styles of connections.

In this construction the washer 180 is held against the inner side of the valve ring 152 and an inwardly facing shoulder 181 on the lower head 173 by a spring 182 interposed between said retaining washer and the upper head 174.

In all of the manually actuated fluid valves of Figs. 1–17, inclusive, and also in the automatic check valves of Figs. 18–20 inclusive, the shank of the valve has been of smaller diameter than the diameter of the valve proper. This has certain advantages, notable in the case of the check valves, in that it provides a seat for the compression springs 160. It is to be understood, however, that the valve may have the same diameter at its head and at its shank. As to the check valves, this merely affects their manufacturing cost and does not affect their operation. As to the fluid valves of Figs. 1–17 inclusive, such a construction means that the valve must be opened as well as closed by a manual actuation of the valve.

I claim as my invention:

A fluid valve device, comprising a body having a valve chamber, a port in said body, a radial valve seat around said port and forming a part of the inner face of the wall of said valve chamber, a counterbore around said port and forming an annular shoulder facing the same direction as said valve seat and spaced axially from and surrounding said valve seat and a washer seat surrounding said counterbore and spaced axially from said annular shoulder, a continuous flexible rubber valve ring arranged in said counterbore with its periphery in spaced relation thereto and in engagement with said annular shoulder, a retaining washer engaging the side of said rubber valve ring opposite said annular shoulder and seated against said washer seat and apertured to provide communication between said valve chamber and the space between the periphery of said rubber ring and said counterbore, a longitudinally movable valve arranged in said valve chamber to be projected through said washer, rubber ring and counterbore and against said seat, said valve having a cylindrical body adapted to engage the bore of said rubber ring and a tapering end adapted to engage said valve seat, a radial enlargement on the end of said valve opposite its tapered end, and a coil compression spring interposed between said washer and said radial enlargement and holding said washer against said washer seat.

ARTHUR E. MILLER.

REFERENCES CITED

The following references are of record in the file of this patent:

UNITED STATES PATENTS

| Number | Name | Date |
|---|---|---|
| 275,484 | Haas | Apr. 10, 1883 |
| 596,303 | O'Neill | Dec. 28, 1897 |
| 782,060 | Rothfuss | Feb. 7, 1905 |
| 804,056 | Schott | Nov. 7, 1905 |
| 1,479,920 | Miller | Jan. 8, 1924 |
| 1,511,302 | Schnetzer | Oct. 14, 1924 |
| 1,865,355 | Carpenter | June 28, 1932 |
| 1,905,822 | Dunn | Apr. 25, 1933 |
| 1,935,899 | Yarnall | Nov. 21, 1933 |
| 2,083,584 | Wineman | June 15, 1937 |
| 2,088,882 | Trimmer | Aug. 3, 1937 |
| 2,129,816 | Byars | Sept. 13, 1938 |
| 2,205,241 | Clark | June 18, 1940 |
| 2,222,926 | Young | Nov. 26, 1940 |
| 2,252,923 | Granetz | Aug. 19, 1941 |

FOREIGN PATENTS

| Number | Country | Date |
|---|---|---|
| 12,911 | Great Britain | of 1904 |